United States Patent [19]

Liao

[11] Patent Number: 5,669,840
[45] Date of Patent: Sep. 23, 1997

[54] TENSION DEVICE FOR BICYCLE DERAILLEUR

[75] Inventor: Chi Chao Liao, Chang Hua Hsien, Taiwan

[73] Assignee: Tektro Technology Corporation, Chang Hua Hsien, Taiwan

[21] Appl. No.: 716,969

[22] Filed: Sep. 20, 1996

[51] Int. Cl.$^6$ ............................................. F16H 59/00
[52] U.S. Cl. ............................................................ 474/80
[58] Field of Search ........................... 474/77–82, 127

[56] References Cited

U.S. PATENT DOCUMENTS

| | | | |
|---|---|---|---|
| 2,099,477 | 11/1937 | Gruyer | 474/80 |
| 2,428,166 | 9/1947 | Letourneur | 474/80 |
| 2,431,513 | 11/1947 | Schwinn | 474/80 |
| 3,929,025 | 12/1975 | Perry | 474/81 X |
| 4,676,118 | 6/1987 | Leiter | 474/82 X |
| 4,758,205 | 7/1988 | Durham | 474/80 |

*Primary Examiner*—Roger J. Schoeppel

[57] ABSTRACT

A tension device is secured to a derailleur system of a bicycle having a frame pivotally coupled to the bicycle for supporting a sprocket and for engaging with a chain. The tension device includes an arm having one end secured to the bicycle and having the other end secured to an auxiliary spring. A block is secured to the frame and has an extension secured to the other end of the spring. The spring may bias the frame and may tension the frame and the chain for preventing the chain from disengaging from the derailleur system.

1 Claim, 3 Drawing Sheets

1
TENSION DEVICE FOR BICYCLE DERAILLEUR

BACKGROUND OF THE INVENTION

1. Field of the Invention

The present invention relates to a tension device, and more particularly to a tension device for a bicycle derailleur system.

2. Description of the Prior Art

Typical bicycle derailleur systems comprise a frame pivotally coupled to the bicycle for rotatably supporting pulleys thereon. The pulleys are provided for engaging with the chain. A coil spring is engaged on the frame for tensioning the chain. However, after use, the coil spring may become fatigue such that the frame may be rotated downward and such that the chain may become loose and may be disengaged from the sprocket and the derailleur.

The present invention has arisen to mitigate and/or obviate the afore-described disadvantages of the conventional bicycle derailleur systems.

SUMMARY OF THE INVENTION

The primary objective of the present invention is to provide a tension device for tensioning the bicycle derailleur system and for preventing the chain from disengaging from the derailleur.

In accordance with one aspect of the invention, there is provided a tension device for a derailleur system of a bicycle, the derailleur system comprising a frame including a first end portion pivotally coupled to the bicycle and including at least one sprocket for engaging with a chain, the frame including a second end portion, and a spring member for tensioning the chain. The tension device comprises an arm including a first end secured to the bicycle and including a second end, a block secured to the second end portion of the frame, the block including an extension extended therefrom and having a free end portion, and a spring element including a first end secured to the second end of the arm and including a second end secured to the free end portion of the extension of the block. The spring element thus may be provided for tensioning the frame and the chain and for preventing the chain from disengaging from the derailleur system.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
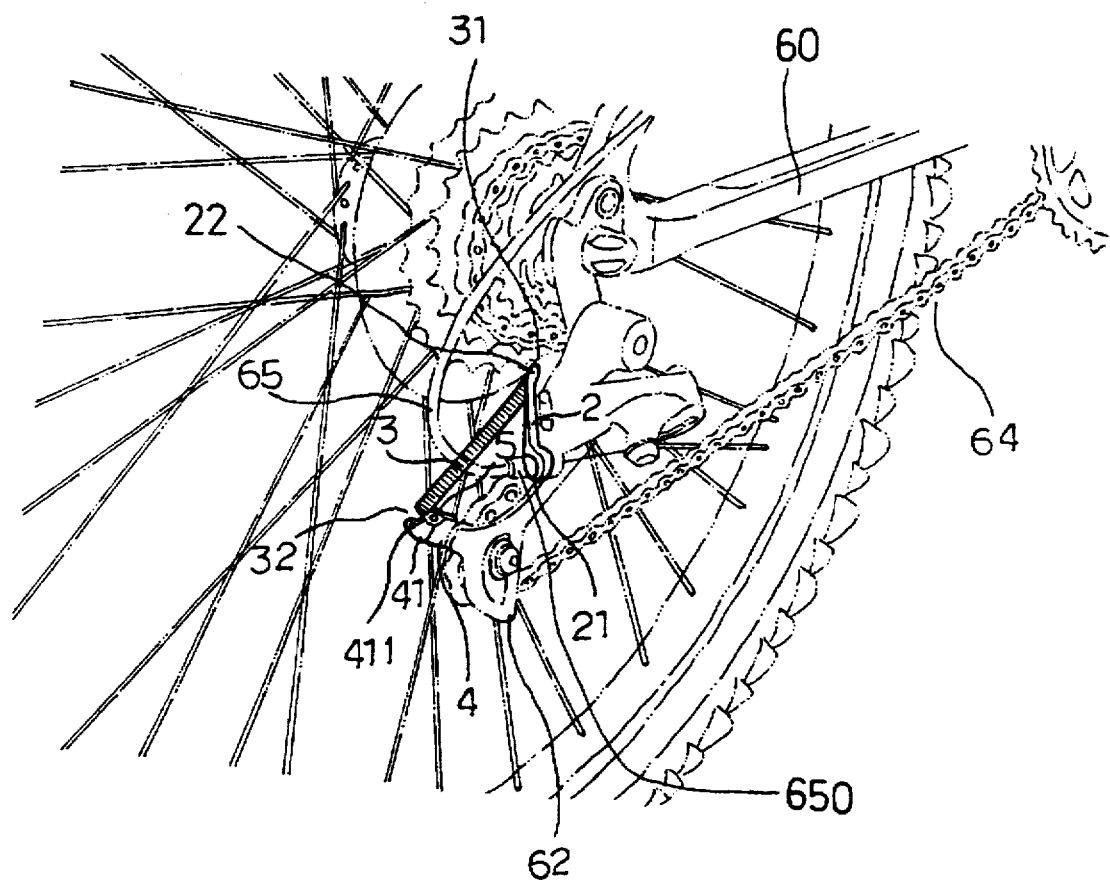
FIG. 1 is a perspective view illustrating an application of a tension device in accordance with the present invention.
Figure 2:
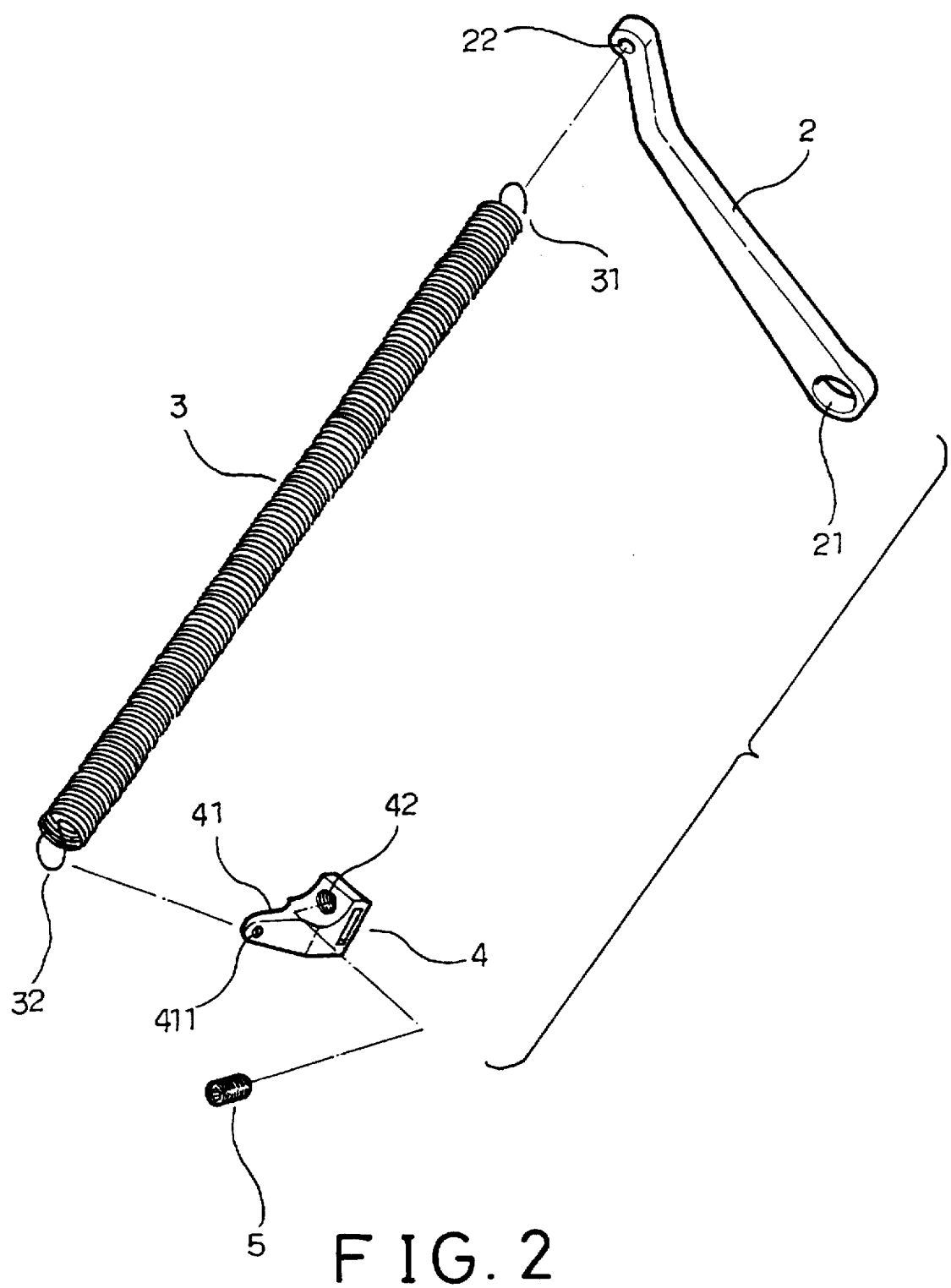
FIG. 2 is an exploded view of the tension device.

Referring to the drawings, and initially to FIGS. 1 and 2, a tension device of the invention is provided for tensioning the bicycle derailleur system and for preventing the chain from disengaging from the bicycle derailleur system. The bicycle derailleur system comprises a frame 62 including an upper end portion pivotally coupled to the rear and bottom portion of the chain stay 60 at a pivot shaft 63. The frame 62 includes at least one sprocket 61 rotatably engaged therein for engaging with the chain 64. A coil spring is engaged on the pivot shaft 63 for biasing the frame 62 and for tensioning the chain 64. The tension device in accordance with the present invention is provided for tensioning the frame 62 and the chain 64. The bicycle derailleur system comprises a coupler 650 for engaging with a gear transmission cable 65.

Figure 3:
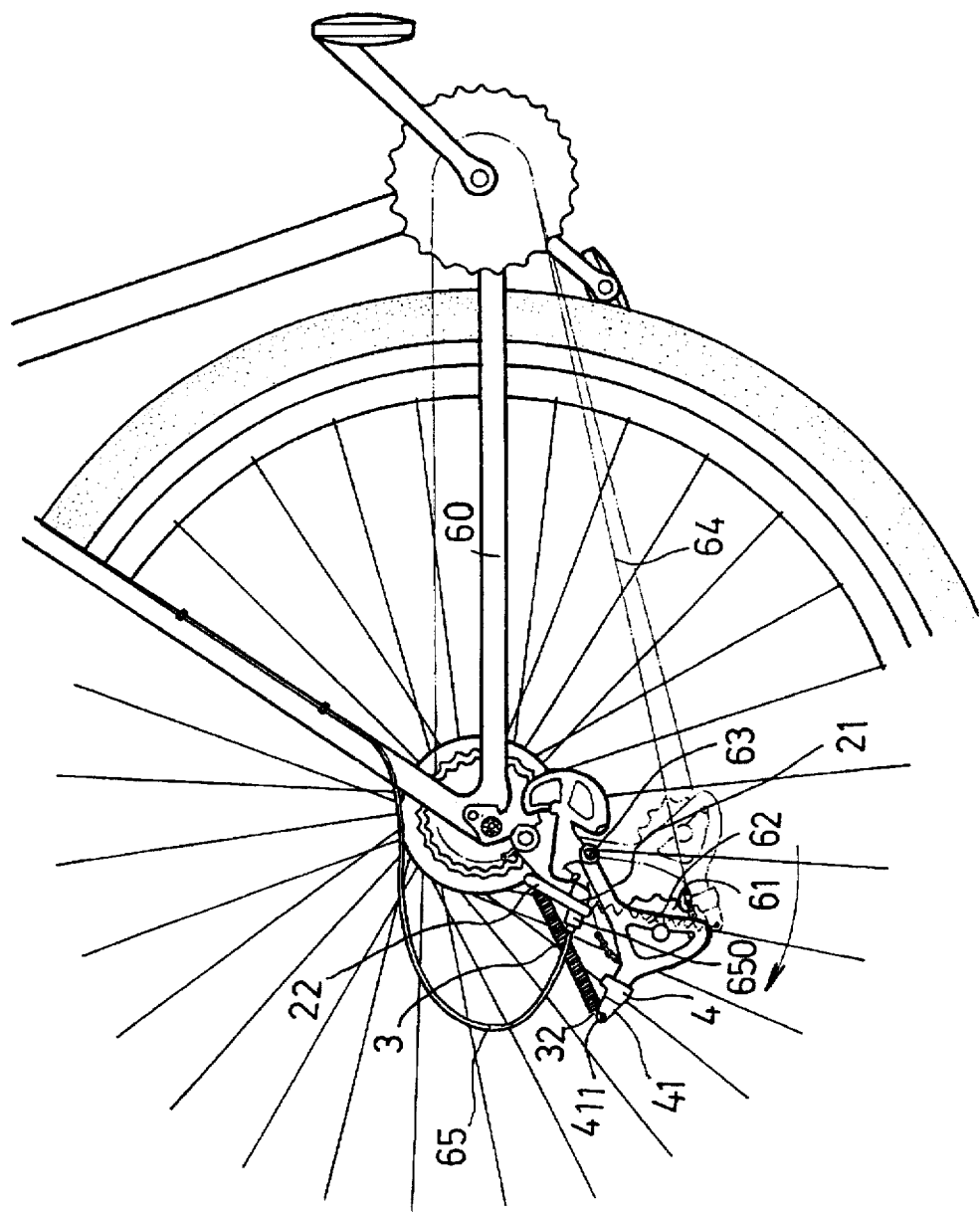
FIG. 3 is a plane view illustrating the operation of the tension device.

The tension device in accordance with the present invention comprises an arm 2 including a hole 21 formed in one end for engaging with the coupler 650 or for securing to the chain stay 60. The arm 2 includes an orifice 22 formed in the other end for engaging with a hook 31 provided in one end of an auxiliary spring 3 which includes another hook 32 formed on the other end thereof. A block 4 includes a screw hole 42 formed therein for engaging with a fastening screw 5 which may secure the block 4 to the lower portion of the frame 62 (FIGS. 1 and 3). The block 4 includes an extension 41 extended therefrom and having an aperture 411 formed therein for engaging with the hook 32 of the spring 3 and for allowing the auxiliary spring 3 to be biased between the other end of the arm 2 and the end portion of the extension 41.

In operation, as shown in FIG. 3, after use, the frame 62 may have a great chance to be rotated downward from the upper position as shown in solid lines to the lower position as shown in dotted lines. The spring 3 may apply a pulling force to the frame 62 and for recovering the frame 62 so as to tension the chain 64 and so as to prevent the chain 64 from disengaging from the bicycle derailleur system.

Accordingly, the tension device includes a spring for engaging with the frame of the bicycle derailleur system and for tensioning the frame so as to tension the chain and so as to prevent the chain from disengaging from the bicycle derailleur system.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tension device for a derailleur system of a bicycle, the derailleur system comprising a frame including a first end portion pivotally coupled to the bicycle and including at least one sprocket for engaging with a chain, the frame including a second end portion, a spring member for tensioning the chain, said tension device comprising:

an arm including a first end secured to the bicycle and including a second end, a block secured to the second end portion of the frame, said block including an extension extended therefrom and having a free end portion, and a spring element including a first end secured to said second end of said arm and including a second end secured to said free end portion of said extension of said block, for tensioning the frame and the chain and for preventing the chain from disengaging from the derailleur system.

* * * * *